US012479938B2

(12) United States Patent
Hayes et al.

(10) Patent No.: US 12,479,938 B2
(45) Date of Patent: Nov. 25, 2025

(54) POLYMERIC RESIN FOR DIELECTRIC APPLICATIONS

(71) Applicant: Rohm and Haas Electronic Materials LLC, Marlborough, MA (US)

(72) Inventors: Colin Hayes, Hudson, MA (US); Michael K. Gallagher, Hopkinton, MA (US); Gregory Prokopowicz, Worcester, MA (US)

(73) Assignee: ROHM AND HAAS ELECTRONIC MATERIALS KOREA LTD. (KR)

( * ) Notice: Subject to any disclaimer, the term of this patent is extended or adjusted under 35 U.S.C. 154(b) by 832 days.

(21) Appl. No.: 17/731,605

(22) Filed: Apr. 28, 2022

(65) Prior Publication Data

US 2023/0348635 A1  Nov. 2, 2023

(51) Int. Cl.
| | |
|---|---|
| *C08F 12/12* | (2006.01) |
| *C08F 2/06* | (2006.01) |
| *C08F 12/32* | (2006.01) |
| *C08F 212/12* | (2006.01) |
| *C08F 212/32* | (2006.01) |
| *C08G 8/32* | (2006.01) |
| *H01B 3/18* | (2006.01) |

(52) U.S. Cl.
CPC .............. *C08F 212/32* (2013.01); *C08F 2/06* (2013.01); *C08F 12/12* (2013.01); *C08F 12/32* (2013.01); *C08F 212/12* (2013.01); *C08G 8/32* (2013.01); *H01B 3/18* (2013.01)

(58) Field of Classification Search
CPC ........ C08F 12/12; C08F 12/32; C08F 112/12; C08F 112/32; C08F 212/12; C08F 212/32
See application file for complete search history.

(56) References Cited

U.S. PATENT DOCUMENTS

| | | | |
|---|---|---|---|
| 4,127,615 A | | 11/1978 | Zahir et al. |
| 5,041,507 A | | 8/1991 | Kanagawa et al. |
| 5,252,687 A | * | 10/1993 | Shiomi ................ C08L 79/085 |
| | | | 525/504 |
| 6,906,120 B1 | * | 6/2005 | Davis .................... B32B 15/08 |
| | | | 525/391 |
| 7,198,878 B2 | | 4/2007 | So et al. |
| 8,143,360 B2 | | 3/2012 | So et al. |
| 8,912,279 B2 | | 12/2014 | Nakamura et al. |
| 9,441,055 B1 | | 9/2016 | Romer et al. |
| 10,030,165 B2 | | 7/2018 | Romer et al. |
| 10,113,024 B2 | | 10/2018 | Romer et al. |
| 10,513,568 B2 | | 12/2019 | Hayes et al. |
| 2008/0004367 A1 | | 1/2008 | Takada et al. |
| 2017/0174805 A1 | | 6/2017 | Romer et al. |
| 2019/0127505 A1 | * | 5/2019 | Hayes .................. C08F 212/08 |
| 2019/0127506 A1 | | 5/2019 | Hayes et al. |
| 2021/0198396 A1 | * | 7/2021 | Murphy .................. B05D 7/24 |

FOREIGN PATENT DOCUMENTS

| | | |
|---|---|---|
| CN | 101768269 B | 7/2012 |
| CN | 106220804 A | 12/2016 |
| JP | 5228453 B2 | 2/2013 |
| JP | 5548083 A | 7/2014 |

OTHER PUBLICATIONS

Konishi, G. et al., Polymer Journal 42, 443-449 (2010).

\* cited by examiner

*Primary Examiner* — Joseph S Del Sole
*Assistant Examiner* — David L Miller
(74) *Attorney, Agent, or Firm* — Shaorong Chen

(57) ABSTRACT

There is provided a resin composition from a mixture including: (a) 60-90 weight % of at least one thermosetting resin; and (b) 10-40 weight % of at least one aryl ether resin. The resin composition can be used in electronics applications.

7 Claims, No Drawings

POLYMERIC RESIN FOR DIELECTRIC APPLICATIONS

FIELD OF THE DISCLOSURE

The present disclosure relates to polymeric resin compositions, methods for preparing such resins, and their use in manufacturing electronic devices.

BACKGROUND INFORMATION

Polymeric resins are used in spin-on dielectric packaging, circuit boards, laminates, and other electronic applications. The resins need to provide films/coatings having good mechanical properties and good adhesive properties, as well as low dielectric properties. In particular, it is desirable to have high tensile strength, high tensile elongation, good adhesion to copper, and low relative permittivity (Dk) and loss tangent (Df) at high frequencies. In addition, it is desirable to be able to cure the resins at lower temperatures without excessive cure times.

There is a continuing need for dielectric resin compositions which have improved properties.

DETAILED DESCRIPTION

As used throughout this specification, the following abbreviations shall have the following meanings, unless the context clearly indicates otherwise: ° C.=degree Celsius; g=gram; nm=nanometer; μm=micron=micrometer; mm=millimeter; sec.=second; and min.=minutes. All amounts are percent by weight ("wt. %") and all ratios are molar ratios, unless otherwise noted. All numerical ranges are inclusive and combinable in any order, except where it is clear that such numerical ranges are constrained to added up to 100%. Unless otherwise noted, all polymer and oligomer molecular weights are weight average molecular weights ('Mw') with unit of g/mol or Dalton and are determined using gel permeation chromatography compared to polystyrene standards.

The articles "a", "an" and "the" refer to the singular and the plural, unless the context clearly indicates otherwise. As used herein, the term "and/or" includes any and all combinations of one or more of the associated items.

As used in herein, R, $R^a$, $R^b$, R', R" and any other variables are generic designations and may be the same as or different from those defined in the formulas.

As used herein, the term "addition polymerizable" as it applies to monomers, is intended to mean unsaturated monomers that are capable of polymerization by the simple linking of groups without the co-generation of other products.

The term "adjacent" as it refers to substituent groups that are bonded to carbons that are joined together with a single or multiple bond. Exemplary adjacent R groups are shown below:

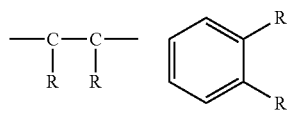

The term "alkoxy" is intended to mean the group RO—, where R is an alkyl group.

The term "alkyl" is intended to mean a group derived from an aliphatic hydrocarbon and includes a linear, a branched, or a cyclic group. A group "derived from" a compound, indicates the radical formed by removal of one or more hydrogen or deuterium. In some embodiments, an alkyl has from 1 to 20 carbon atoms.

The term "aromatic compound" is intended to mean an organic compound comprising at least one unsaturated cyclic group having 4n+2 delocalized pi electrons.

The term "aryl" is intended to mean a group derived from an aromatic compound having one or more points of attachment. The term includes groups which have a single ring and those which have multiple rings which can be joined by a single bond or fused together. Carbocyclic aryl groups have only carbons in a ring structure. Heteroaryl groups have at least one heteroatom in a ring structure.

The term "alkylaryl" is intended to mean an aryl group having one or more alkyl substituents.

The term "aryloxy" is intended to mean the group RO—, where R is an aryl group.

The term "curable" as it applies to a composition, is intended to mean a material that becomes harder and less soluble in solvents when exposed to radiation and/or heat, or under the conditions of use.

The term "liquid composition" is intended to mean a liquid medium in which a material is dissolved to form a solution, a liquid medium in which a material is dispersed to form a dispersion, or a liquid medium in which a material is suspended to form a suspension or an emulsion.

The term "(meth)acrylate" is intended to mean a group which is either an acrylate or a methacrylate.

The term "solvent" is intended to mean an organic compound that is a liquid at the temperature of use. The term is intended to encompass a single organic compound or mixture of two or more organic compounds.

The terms "film" and "layer" are used interchangeably through this specification.

All ranges are inclusive and combinable. For example, the term "a range of 50 to 3000 cPs, or 100 or more cPs" would include each of 50 to 100 cPs, 50 to 3000 cPs and 100 to 3000 cPs.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the disclosed subject matter hereof is described as consisting essentially of certain features or elements in which embodiment features or elements that would materially alter the principle of operation or the distinguishing characteristics of the embodiment are not present therein. A further alternative embodiment of the described subject matter hereof is described as consisting of certain features or elements in which embodiment, or in insubstantial variations thereof, only the features or elements specifically stated or described are present.

Unless otherwise defined, all technical and scientific terms used herein have the same meaning as commonly understood by one of ordinary skill in the art to which this disclosure belongs. Although methods and materials similar or equivalent to those described herein can be used in the practice or testing of embodiments of the present disclosure, suitable methods and materials are described below. In addition, the materials, methods, and examples are illustrative only and not intended to be limiting.

To the extent not described herein, many details regarding specific materials, processing acts, and circuits are conventional and may be found in textbooks and other sources within the photoresist, dielectric materials, and semiconductive member arts.

There is provided a resin composition from a mixture comprising: (a) 60-90 weight % of at least one thermosetting resin; and (b) 10-40 weight % of at least one aryl ether resin.

The thermosetting resin is not particularly limited and is selected from the group consisting of arylcyclobutenes, vinyl radical cured polymers, bismaleimide thermosets, epoxy thermosets, and thermosets cured by Michael Addition.

The arylcyclobutene resin contains a polymerization product from a mixture comprising (a) 10-50 mol % of one or more addition polymerizable arylcyclobutene monomers and one or more monomers selected from the group consisting of: (b) 15-60% of one or more dienophile monomers; (c) 15-50 mol % of one or more diene monomers; and (d) 0-10 mol % of one or more heterocycle containing monomers.

The arylcyclobutene resin is prepared from an addition polymerizable arylcyclobutene monomer that is an arylcyclobutene having at least one addition polymerizable substituent. The substituent can be a vinyl group, an allyl group, or a (meth)acrylate group. The monomer can be present in an amount of 10-50 mol %, or in some embodiments 20-40 mol %, based on the total monomers present in the copolymerization.

In some embodiments, the arylcyclobutene monomer has Formula A-1, Formula A-2, or Formula A-3, shown below:

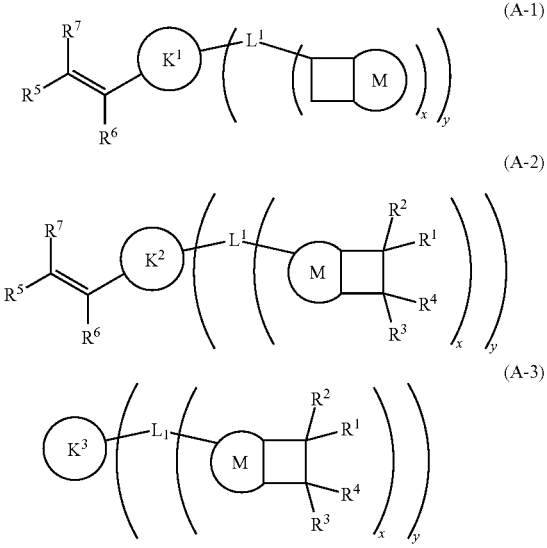

In Formula A-1, $K^1$ can be a divalent group selected from the group consisting of alkyl, aryl, carbocyclic aryl, polycyclic aryl, heteroaryl, aryloxy, arylalkyl, carbonyl, ester, carboxyl, ether, thioester, thioether, tertiary amine, and combinations thereof. In some non-limiting embodiments, $K^1$ can be an unsubstituted $C_{6-36}$ carbocyclic aryl group having no heteroatoms, or an unsubstituted $C_{6-18}$ carbocyclic aryl group having no heteroatoms; or a substituted $C_{6-36}$ carbocyclic aryl group having at least one substituent selected from the group consisting of alkyl and alkoxy, or a substituted $C_{6-18}$ carbocyclic aryl group having at least one substituent selected from the group consisting of alkyl and alkoxy; or an unsubstituted $C_{3-36}$ heteroaryl group, or an unsubstituted $C_{3-18}$ heteroaryl group; or a substituted $C_{6-36}$ heteroaryl group having at least one substituent selected from the group consisting of alkyl and alkoxy, or a substituted $C_{6-18}$ heteroaryl group having at least one substituent selected from the group consisting of alkyl and alkoxy; or a unsubstituted $C_{6-36}$ aryloxy group having no ring heteroatoms, or an unsubstituted $C_{6-18}$ aryloxy group having no ring heteroatoms; or a substituted $C_{3-36}$ heteroaryloxy group having at least one substituent selected from the group consisting of alkyl and alkoxy, or a substituted $C_{3-18}$ heteroaryloxy group having at least one substituent selected from the group consisting of alkyl and alkoxy; or an unsubstituted $C_{6-36}$ arylalkyl group having no heteroatoms, or an unsubstituted $C_{6-18}$ arylalkyl group having no heteroatoms; or a substituted $C_{3-36}$ heteroarylalkyl group having at least one substituent selected from the group consisting of alkyl and alkoxy, or a substituted $C_{3-18}$ heteroarylalkyl group having at least one substituent selected from the group consisting of alkyl and alkoxy.

In Formula A-1, $L^1$ is a covalent bond or a multivalent linking group. In some non-limiting embodiments, $L^1$ is a $C_{6-12}$ carbocyclic aryl group having no ring heteroatoms or is selected from the group consisting of phenyl, biphenyl, and naphthyl.

In Formula A-1, M is a substituted or unsubstituted divalent aromatic or polyaromatic radical group, or a substituted or unsubstituted divalent heteroaromatic or polyheteroaromatic radical group. In some non-limiting embodiments of Formula A-1, M is an unsubstituted $C_{6-36}$ carbocyclic aryl group having no heteroatoms, or an unsubstituted $C_{6-18}$ carbocyclic aryl group having no heteroatoms; or a substituted $C_{6-36}$ carbocyclic aryl group having at least one substituent selected from the group consisting of alkyl and alkoxy, or a substituted $C_{6-18}$ carbocyclic aryl group having at least one substituent selected from the group consisting of alkyl and alkoxy; or an unsubstituted $C_{3-36}$ heteroaryl group, or an unsubstituted $C_{3-18}$ heteroaryl group; or a substituted $C_{6-36}$ heteroaryl group having at least one substituent selected from the group consisting of alkyl and alkoxy, or a substituted $C_{6-18}$ heteroaryl group having at least one substituent selected from the group consisting of alkyl and alkoxy.

In Formula A-1, $R^5$ is selected from the group consisting of hydrogen, substituted or unsubstituted alkyl, substituted or unsubstituted alkyloxy, substituted or unsubstituted aryl, substituted or unsubstituted aryloxy, akylthio, arylthiol, substituted alkyl amino, and substituted aryl amino. In some non-limiting embodiments of Formula A-1, $R^5$ is hydrogen; or a $C_{1-6}$ alkyl, or a $C_{1-3}$ alkyl; or a $C_{1-6}$ alkoxy, or a $C_{1-3}$ alkoxy.

In Formula A-1, $R^6$ and $R^7$ are the same or different and are independently selected from the group consisting of hydrogen, deuterium, cyano, halo, methyl, vinyl, allyl, and a substituted or unsubstituted isoprene having 1-100 carbon atoms.

In some non-limiting embodiments of Formula A-1, $R^5=R^6=R^7=$hydrogen.

In some non-limiting embodiments of Formula A-1, x and y are the same or different and are an integer from 1 to 5, wherein when $L^1$ is a covalent bond, y=1.

In Formula A-2, $K^2$ can be a single bond or a divalent group selected from the group consisting of alkyl, aryl, carbocyclic aryl, polycyclic aryl, heteroaryl, aryloxy, arylalkyl, carbonyl, ester, carboxyl, and ether, thioester, thioether, tertiary amine, and combinations thereof. In some non-limiting embodiments, $K^2$ can be a covalent bond; or an unsubstituted $C_{6-36}$ carbocyclic aryl group having no heteroatoms, or an unsubstituted $C_{6-18}$ carbocyclic aryl group having no heteroatoms; or an substituted $C_{6-36}$ carbocyclic aryl group having at least one substituent selected from the group consisting of alkyl and alkoxy, or a substituted $C_{6-18}$ carbocyclic aryl group having at least one substituent selected from the group consisting of alkyl and alkoxy; or an unsubstituted $C_{3-36}$ heteroaryl group, or an unsubstituted $C_{3-18}$ heteroaryl; or a substituted $C_{6-36}$ heteroaryl group having at least one substituent selected from the group consisting of alkyl and alkoxy, or a substituted $C_{6-18}$ heteroaryl group having at least one substituent selected from the group consisting of alkyl and alkoxy; or a unsubstituted $C_{6-36}$ aryloxy group having no ring heteroatoms, or an unsubstituted $C_{6-18}$ aryloxy group having no ring heteroatoms; or a substituted $C_{3-36}$ heteroaryloxy group having at least one substituent selected from the group consisting of alkyl and alkoxy, or a substituted $C_{3-18}$ heteroaryloxy group having at least one substituent selected from the group consisting of alkyl and alkoxy; or an unsubstituted $C_{6-36}$ arylalkyl group having no heteroatoms, or an unsubstituted $C_{6-18}$ arylalkyl group having no heteroatoms; or a substituted $C_{3-36}$ heteroarylalkyl group having at least one substituent selected from the group consisting of alkyl and alkoxy, or a substituted $C_{3-18}$ heteroarylalkyl group having at least one substituent selected from the group consisting of alkyl and alkoxy.

$L^1$, M, x, and y in Formula A-1 apply equally to $L^1$, M, x, and y in Formula A-2. All of the above-described embodiments for $R^5$ in Formula A-1 apply equally to $R^1$-$R^7$ in Formula A-2.

In Formula A-3, $K^3$ is a polymerizable functional group selected from the group consisting of vinyl, styryl, maleimide, acrylic, methacrylic, allylic, alkynyl or the functional equivalent.

$L^1$, M, x, and y in Formula A-1 and Formula A-2, apply equally to $L^1$, M, x, and y in Formula A-3. All of the above-described embodiments for $R^1$-$R^4$ in Formula A-1 and Formula A-2 apply equally to $R^1$-$R^4$ in Formula A-3.

In one non-limiting embodiment, the arylcyclobutene monomer has Formula A-1-a:

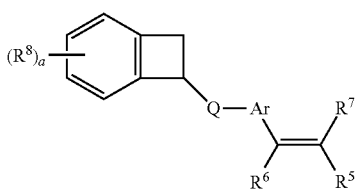

(A-1-a)

where:
Ar is a substituted or unsubstituted carbocyclic aryl or a substituted or unsubstituted heteroaryl group; Q is a covalent bond, O, S, or $NR^a$; $R^a$ is selected from the group consisting of hydrogen, deuterium, substituted or unsubstituted carbocyclic aryl, and substituted or unsubstituted heteroaryl; $R^5$-$R^7$ are the same or different and are independently selected from the group consisting of hydrogen, deuterium, alkyl, alkoxy, aryloxy, a substituted or unsubstituted carbocyclic aryl group, and a substituted or unsubstituted heteroaryl group; $R^8$ is selected from the group consisting of alkyl, alkoxy, a substituted or unsubstituted carbocyclic aryl group, and a substituted or unsubstituted heteroaryl group; and a is an integer from 0 to 4.

In Formula A-1-a, Ar is an unsubstituted carbocyclic aryl group having 6-36 ring carbons, or an unsubstituted carbocyclic aryl group having 6-12 ring carbons; or a substituted carbocyclic aryl group having 6-36 ring carbons and having at least one substituent selected from the group consisting of alkyl and alkoxy, or a substituted carbocyclic aryl group having 6-12 ring carbons and having at least one substituent selected from the group consisting of alkyl and alkoxy; or heteroaryl group having 3-36 ring carbons, or heteroaryl group having 3-12 ring carbons; or a substituted heteroaryl group having 6-36 ring carbons and having at least one substituent selected from the group consisting of alkyl and alkoxy, or a substituted heteroaryl group 3-12 ring carbons and having at least one substituent selected from the group consisting of alkyl and alkoxy; or selected from the group consisting of phenyl, biphenyl, and naphthyl.

In some non-limiting embodiments of Formula A-1-a, Q is a covalent bond, or O, or S, or NH, or $NCH_3$.

In some non-limiting embodiments of Formula A-1-a, a is 0; or 1; or 2; or >0; or >0 and at least one $R^8$ is a $C_{1-6}$ alkyl, or $C_{1-3}$ alkyl; or >0 and at least one $R^8$ is a $C_{1-6}$ alkoxy, or $C_{1-3}$ alkoxy.

In another non-limiting embodiment, the arylcyclobutene monomer has Formula A-2-a:

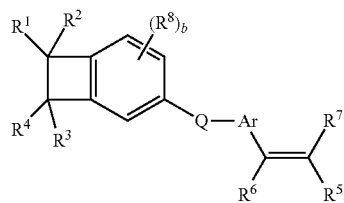

(A-2-a)

where:
Ar is a substituted or unsubstituted carbocyclic aryl or a substituted or unsubstituted heteroaryl group; Q is a covalent bond, O, S, or $NR^a$; $R^a$ is selected from the group consisting of hydrogen, deuterium, substituted or unsubstituted carbocyclic aryl, and substituted or unsubstituted heteroaryl; $R^1$-$R^7$ are the same or different and are independently selected from the group consisting of hydrogen, deuterium, alkyl, alkoxy, aryloxy, a substituted or unsubstituted carbocyclic aryl group, and a substituted or unsubstituted heteroaryl group; $R^8$ is selected from the group consisting of alkyl, alkoxy, a substituted or unsubstituted carbocyclic aryl group, and a substituted or unsubstituted heteroaryl group; and b is an integer from 0 to 3.

In Formula A-2-a, b can be 0; or 1; or 2; or >0; or >0 and at least one $R^8$ is a $C_{1-6}$ alkyl, or $C_{1-3}$ alkyl; >0 and at least one $R^8$ is a $C_{1-6}$ alkoxy, or $C_{1-3}$ alkoxy.

All of the above-described embodiments for Ar and Q in Formula A-1-a, apply equally to Ar and Q in Formula A-2-a. All of the above-described embodiments for $R^5$ in Formula A-1, apply equally to $R^1$-$R^7$ in Formula A-2-a.

Examples of the arylcyclobutene monomer can include, but are not limited to, 1-(4-vinyl phenoxy)-benzocyclobutene, 1-(4-vinyl methoxy)-benzocyclobutene, 1-(4-vinyl phenyl)-benzocyclobutene, 1-(4-vinyl hydroxynaphthyl)-benzocyclobutene, 4-vinyl-1-methyl-benzocyclobutene, 4-vinyl-1-methoxy-benzocyclobutene, and 4-vinyl-1-phenoxy-benzocyclobutene.

The arylcyclobutene resin is prepared from one or more dienophile monomers present in an amount of 5-70 mol %, or in some embodiments 15-60 mol %, based on the total monomers present in the copolymerization having a structure given by Formula (II):

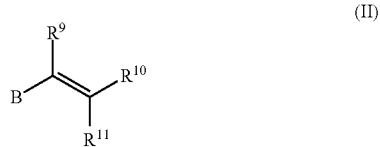

(II)

In Formula (VII) B can be hydrogen, substituted or unsubstituted alkyl, substituted or unsubstituted aromatic, substituted or unsubstituted heteroaromatic, substituted or unsubstituted alkyloxy, or hydroxy. $R^9$-$R^{11}$ are the same or different and are independently selected from the group consisting of hydrogen, deuterium, methyl, vinyl, allyl, substituted or unsubstituted isoprene having 1-100 carbon atoms, substituted or unsubstituted alkyl group having 1 to 100 carbon atoms, halogen, cyano, substituted or unsubstituted aryl group having 6 to 100 carbon atoms, substituted or unsubstituted heteroaryl group having 6 to 100 carbon atoms, and combinations thereof.

In some non-limiting embodiments, the one or more dienophile monomers has a structure given by Formula (III)

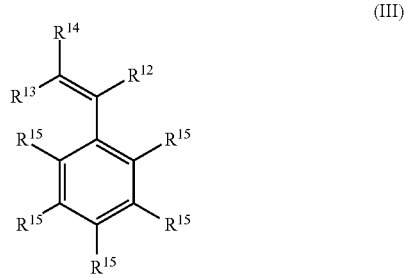

(III)

where $R^{12}$-$R^{14}$ are the same or different and are independently selected from the group consisting of hydrogen and $C_{1-5}$ alkyl; and $R^{15}$ is the same or different at each occurrence and is selected from the group consisting of hydrogen and $C_{1-5}$ alkyl, and wherein adjacent $R^{15}$ groups can be joined to form a fused 6-membered aromatic ring.

In some non-limiting embodiments, the one or more dienophile monomers is selected from the group consisting of styrene, α-methylstyrene, vinyl toluene, 1-vinylnaphthalene, and 2-vinylnaphthalene.

The diene monomer can be present in an amount of 15-50 mol %, 15-30 mol %, or 20-25 mol % based on the total monomers present in the copolymerization. In one embodiment, the diene monomer has Formula (IV), as shown below:

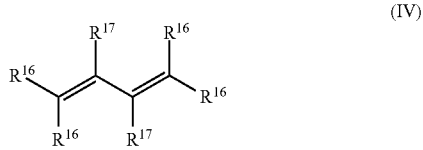

(IV)

where $R^{16}$ is the same or different at each occurrence and is selected from the group consisting of hydrogen and methyl; and $R^{17}$ is the same or different at each occurrence and is selected from the group consisting of hydrogen, $C_{1-5}$ alkyl, $C_{1-5}$ alkoxy, $C_{1-5}$ thioalkyl, and $C_{5-12}$ alkenyl.

In Formula IV, all $R^{16}$ can be hydrogen, or three $R^{16}$ are hydrogen and one $R^{16}$ is methyl. The two $R^{17}$ are the same; or different; or at least one $R^{17}$ is hydrogen; or at least one $R^{17}$ is a $C_{1-3}$ alkyl, or methyl; or at least one $R^{17}$ is a $C_{1-3}$ alkoxy, or methoxy; or at least one $R^{17}$ is an alkenyl having the formula —$(CH_2)_c$—CH=$C(R^{18})_2$, where c is an integer of 1-5 and $R^{18}$ is hydrogen or methyl.

Examples of the diene monomers can include, but are not limited to, butadiene, isoprene, 1,3-pentadiene, 2,4-hexadiene, cyclopentadiene, β-myrcene, ocimene, cyclooctadiene, farnesene, and polymerizable terpenes.

The mixture can further comprise 1-20 mol %, or 3-10 mol %, or 4-7 mol % addition polymerizable vinyl-substituted $C_{3-12}$ heterocycle or a vinyl-substituted $C_{3-5}$ heterocycle monomer. In some embodiments, the heterocycle monomer can be further substituted with one or more $C_{1-6}$ alkyl, a $C_{6-12}$ carbocyclic aryl, or a $C_{3-12}$ heteroaryl. The heterocycle monomer is selected from the group consisting of N-heterocycles, S-heterocycles, N,S-heterocycles, and substituted derivatives thereof.

The N-heterocycle can have at least one ring nitrogen. Examples of N-heterocycles can include, but are not limited to, pyrrole, pyridine, diazines, triazines, imidazoles, benzoimidazoles, and quinolones. The S-heterocycle can have at least one ring sulfur. Examples of S-heterocycles can include, but are not limited to, thiophene, benzothiophene, and dibenzothiophene. The N,S-heterocycle can have at least one ring nitrogen and one ring sulfur. Examples of N,S-heterocycles can include, but are not limited to thiazole, thiadiazole, and thiadiazine.

In one non-limiting embodiment, the heterocycle monomer has Formula V, shown below:

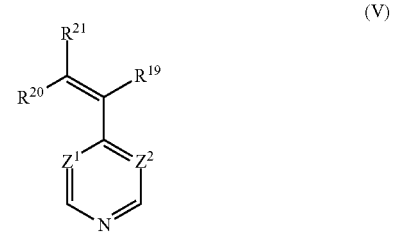

(V)

where $Z^1$ and $Z^2$ are the same or different and are N or $CR^{22a}$; and $R^{19}$-$R^{21}$ and $R^{22a}$ are the same or different at each occurrence and are selected from the group consisting of hydrogen and $C_{1-5}$ alkyl.

In Formula V, $Z^1$=$Z^2$; or $Z^1$≠$Z^2$; or $Z^1$ is CH, or $CR^{22a}$, or N, or CH; or $Z^2$ is $CR^{22a}$, or N. $R^{19}$ is hydrogen, or a $C_{1-3}$ alkyl, or methyl. All of the above-described embodiments for $R^{19}$ in Formula V apply equally to $R^{20}$, $R^{21}$, and $R^{22a}$ in Formula V; or $R^{19}$=$R^{20}$=$R^{21}$=hydrogen.

Examples of the heterocycle monomers can include, but are not limited to, 4-vinyl pyridine, 4-vinyl-1,3-diazine, 2-vinyl-1,3,5-triazine, and 4-methyl-5-vinyl-1,3-thiazole. Furthermore, one or more additional addition polymerizable monomers can be present in the polymerization.

In some non-limiting embodiments, the at least one arylcyclobutene resin has a structure given by Formula (VI)

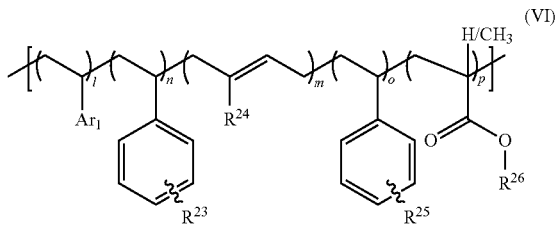

(VI)

where Ar is a heterocycle containing an N, S, O or P atom; $R^{23}$ is H, $CH_3$, ethyl or t-butyl; $R^{24}$ is H, $CH_3$, $C_1$-$C_{12}$ alkyl or $C_1$-$C_{12}$ alkene; $R^{25}$ is cyclobutene, 1-oxy-cyclobutene, or α-methyl cyclobutene; 1 is an integer of 0 to 10; $R^{26}$ is an alkyl group of 1 to 12 carbon atoms, a cycloalkyl group, or an aryl group; n is an integer of 5 to 70; m is an integer of 5 to 50; and o is an integer of 5 to 50; and p is an integer of 5 to 50, such that 1+n+m+o+p=100.

In some non-limiting embodiments, the at least one aryl ether resin has a structure given by Formula (VII)

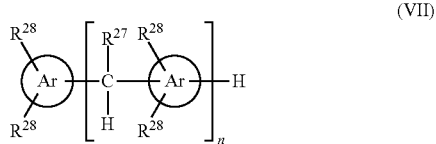

(VII)

where $R^{27}$ is the same or different at each occurrence and is selected from the group consisting of hydrogen, methyl, akyl, aryl, and Ar—O—$CH_2$—CH=$CH_2$; $R^{28}$ is the same or different at each occurrence and is selected from the group consisting of hydrogen, amino, hydroxyl, allyl, —O—$CH_2$—CH=$CH_2$, and alkyl; Ar is the same or different at each occurrence and is selected from the group consisting of benzyl, naphthyl, biphenyl, and bisphenol A; and n=1-10.

In some non-limiting embodiments; the at least one aryl ether resin is present at 5-50 weight % of the resin composition, in some non-limiting embodiments 10-40 weight %, and in some non-limiting embodiments 15-25 weight %.

In some non-limiting embodiments; the at least one aryl ether resin has a molecular weight less than 5,000 Da, in some non-limiting embodiments less than 4,000 Da, in some non-limiting embodiments less than 3,000 Da, in some non-limiting embodiments less than 2,000 Da, and in some non-limiting embodiments less than 1,000 Da.

In some non-limiting embodiments; the allyl ether resin having a structure given by Formula (VII) is prepared from precursors based on one or more copolymers selected from the group consisting of phenol benzaldehyde copolymers, phenol formaldehyde copolymers, biphenyl/phenol formaldehyde copolymers, bisphenol-A formaldehyde copolymers, cresol formaldehyde copolymers, naphthalene/phenol formaldehyde copolymers, and the like and combinations thereof.

In some non-limiting embodiments; the precursors used can be one or more selected from the group consisting of a phenol-based curing agent having a novolac structure and a naphthol-based curing agent having a novolac structure. In some non-limiting embodiments; phenol novolac resin, a triazine skeleton-containing phenol novolac resin, a naphthol novolac resin, a naphthol aralkyl type resin, a triazine skeleton-containing naphthol resin, and a biphenyl aralkyl type phenol resin may be used. Commercially-available biphenyl aralkyl type phenol resins include "MEH-7700," "MEH-7810," "MEH-7851," and "MEH7851-4H" (available from Meiwa Plastic Industries, Ltd.) and "GPH" (available from NIPPON KAYAKU Co., Ltd.). Commercially-available naphthol novolac resin include "NHN" and "CBN" (available from NIPPON KAYAKU Co., Ltd.). Commercially-available naphthol aralkyl type resin include "SN170," "SN180," "SN190," "SN475," "SN485," "SN495," "SN395," and "SN375" (available from Tohto Kasei Co., Ltd.). Commercially-available phenol novolac resin include "TD2090" (available from DIC Corporation), commercially-available triazine skeleton-containing phenol novolac resin include "LA3018," "LA7052," "LA7054," and "LAI 356" (available from DIC Corporation). These resins may be used alone or in combination of two, three, or more.

In some non-limiting examples, the at least one aryl ether resin is selected from the group consisting of Formula (B1)-Formula (B6)

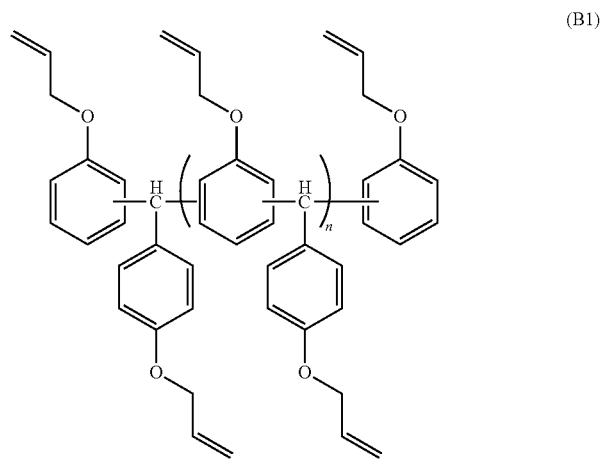

(B1)

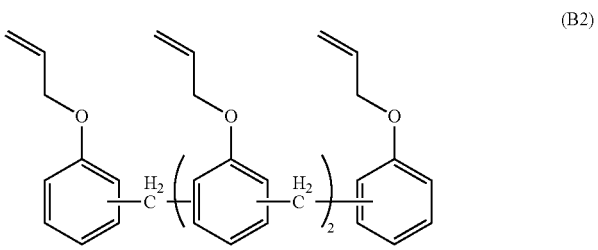

(B2)

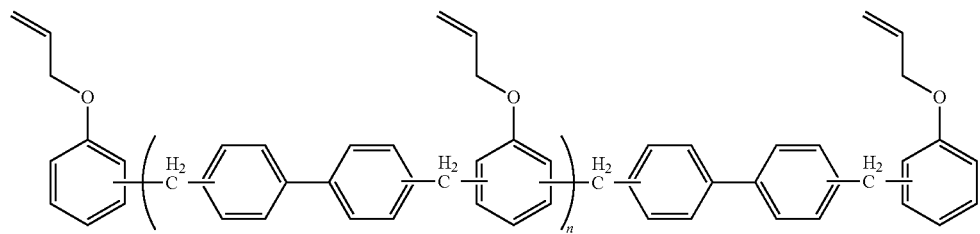
(B3)

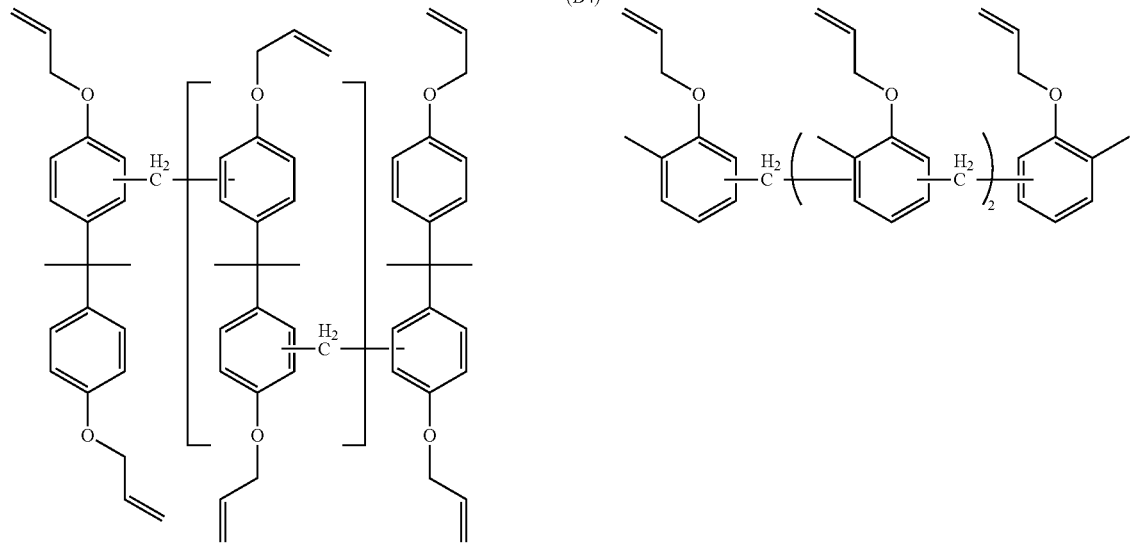
(B4)

(B5)

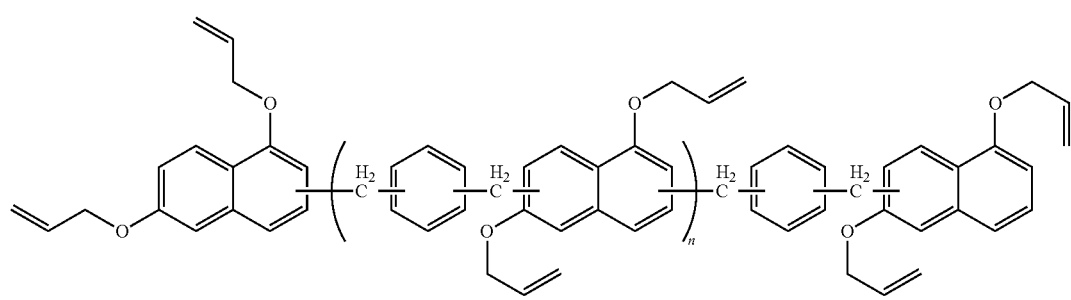
(B6)

where n = 1-10

The arylcyclobutene resins disclosed herein can be formed by copolymerizing the above-described addition polymerizable monomers by the action of a thermal initiator, photoinitiator or other photoactive compounds.

In one embodiment, the copolymerization process comprises providing a mixture of the addition polymerizable monomers described above and a radical initiator in a polar solvent; and heating the mixture to a temperature of 50-150° C. over a period of 5-50 hours. In another embodiments, the copolymerization process comprises providing a mixture of the addition polymerizable monomers described above in a polar solvent; heating the mixture to a temperature of 50-150° C. to form a heated mixture, and continuously feeding a radical initiator into the heated mixture over a period of 5-50 hours.

The polar solvent can be a single organic compound or a mixture of compounds. The polar solvent is one in which the monomers are miscible or dispersible. The polar solvent can be present in an amount of 10-70 wt. %, or 20-50 wt. % based on the total weight of the reaction mixture. In one embodiment, the polar solvent can be an aprotic organic solvent, such as (cyclo)alkanone or cyclic ester, or a linear or branched ketone and $C_{1-8}$ esters.

The radical initiator is generally an azo compound or an organic peroxide. In one embodiment, the radical initiator is an oil soluble azo compound. Such initiators can include, for example, dimethyl 2,2'-azobis(2-methylpropionate) and 2,2'-azobis(2,4-dimethylvaleronitrile). The total initiator added can be in a range of 1-5 wt. %, based on the weight of the starting reaction mixture.

After the desired reaction time, the resulting final reaction mixture is obtained, cooled to room temperature (20-25° C.), and treated as necessary. The polymers of the present disclosure may be used as is or may be isolated by adding a non-solvent, such as water or methanol, to precipitate the polymer from the solution and thereafter removing the organic solvent.

The aryl ether resins disclosed herein can be formed by reaction of an phenol-aldehyde type copolymer with an allyl halide. The phenol-aldehyde resin can be deprotonated with a suitable base, and substitution can occur to produce the allylic ether product.

The present disclosure is further directed to liquid compositions comprising the above-described resins dissolved or dispersed in one or more organic solvents. The liquid compositions can be deposited onto a substrate to form a film using any known technique and subsequently heated to remove solvent. This can be followed by an additional heating step to cure the film. In some non-limiting embodiments, the liquid compositions of the present disclosure can be used to form a dielectric film for photolithography, packaging, adhesive, sealing and bulk dielectric applications, such as in spin on coatings or buffer layers. The dielectric film formed on the substrate can be used directly or can be peeled off and used on different substrates in electronic devices.

Any substrate known in the art can be used in the present disclosure. Examples of the substrate can include, but are not limited to, silicon, copper, silver, indium tin oxide, silicon dioxide, glass, silicon nitride, aluminum, gold, polyimide and epoxy mold compound.

Suitable organic solvents are those in which the resins are soluble. Particularly useful organic solvents are any solvents useful in the making or formulation of arylcyclobutene polymers. Exemplary organic solvents include, without limitation, polar protic and polar aprotic solvents, for example, alcohols such as 2-methyl-1-butanol, 4-methyl-2-pentanol, and methyl isobutyl carbinol; esters such as ethyl lactate, propylene glycol methyl ether acetate, methyl 2-hydroxyisobutyrate, methyl 3-methoxypropionate, n-butyl acetate and 3-methoxy-1-butyl acetate; lactones such as gamma-butyrolactone; lactams such as N-methylpyrrolidinone; ethers such as propylene glycol methyl ether and dipropylene glycol dimethyl ether isomers, such as PRO-GLYDE™ DMM (The Dow Chemical Company, Midland, MI); ketones such as 2-butanone, cyclopentanone, cyclohexanone and methylcyclohexanone; and mixtures thereof.

Suitable additives can be added into the liquid compositions of the present disclosure. Examples of the additives can include, without limitation, one or more of each of curing agents, crosslinkers, such as crosslinking monomers separate from the polymer, surfactants, inorganic fillers, organic fillers, plasticizers, adhesion promoters, metal passivating materials, and combinations of any of the foregoing. Suitable surfactants are well-known to those skilled in the art, and nonionic surfactants are preferred. Such surfactants may be present in an amount of from 0 to 10 g/L, or from 0 to 5 g/L.

Any suitable inorganic fillers may optionally be used in the present compositions and are well-known to those skilled in the art. Exemplary inorganic fillers can include, but are not limited to, silica, alumina, barium sulfate, talc, clay, a mica powder, aluminum hydroxide, magnesium hydroxide, calcium carbonate, magnesium carbonate, magnesium oxide, boron nitride, aluminum borate, barium titanate, strontium titanate, calcium titanate, magnesium titanate, bismuth titanate, titanium oxide, barium zirconate, and calcium zirconate. In some non-limiting embodiments the silica may be amorphous silica, pulverized silica, fumed silica, crystalline silica, synthetic silica, or hollow silica. In some non-limiting embodiments, spherical silica is used. Inorganic fillers may be used individually or in combination of two or more. In some non-limiting embodiments, no inorganic fillers are used.

The average particle diameter of the inorganic filler is not particularly limited. From the viewpoint of forming a fine wiring on an insulating layer, the upper limit of the average particle diameter of the inorganic filler is 5 µm or less, in some non-limiting embodiments 3 µm or less, in some non-limiting embodiments 1 µm or less, in some non-limiting embodiments 0.7 µm or less, in some non-limiting embodiments 0.5 µm or less, in some non-limiting embodiments 0.4 µm or less, and in some non-limiting embodiments 0.3 µm or less. On the other hand, the lower limit of the average particle diameter of the inorganic filler can be 0.01 µm or more, in some non-limiting embodiments 0.03 µm or more, in some non-limiting embodiments 0.05 µm or more, in some non-limiting embodiments 0.07 µm or more, and in some non-limiting embodiments 0.1 µm or more.

The average particle diameter of the inorganic filler can be measured by a laser diffraction and scattering method on the basis of the Mie scattering theory. Specifically, the particle size distribution of the inorganic filler is prepared on the volume basis using a laser diffraction particle size distribution measuring device, and a median diameter thereof can be measured as an average particle diameter. Measurements can be made on a dispersion in which the inorganic filler is dispersed in water by ultra-sonification. Measurements can be made on commercially available equipment such as the LA-500, 750, and 950 manufactured by Horiba, Ltd., or the like.

The inorganic filler is typically used in an amount of from 35 wt % to 80 wt % based on the total non-volatile weight of the composition.

The inorganic filler may or may not be treated with a coupling agent surface treatment to compatibilize the filler with the thermosetting resin. One having skill in the art can discern how the surface treatment should be selected so as to match the appropriate thermosetting chemistry. Non-limiting examples of surface treatments include phenyltrimethoxysilane, methacrylpropyltrimethoxy silane, N-phenyl-3-aminopropyltrimethoxysilane, mercaptopropyltrimethoxysilane, hexamethyldisilazane, and diisopropoxytitanium bis(triethanolaminate).

The metal passivating material can be a copper passivating agent. Suitable copper passivating agents are well known in the art and include imidazoles, benzotriazoles, ethylene diamine or its salts or acid esters, and iminodiacetic acids or salts thereof. The metal passivating material is typically used in an amount of from 0 to 5 wt. %, or from 0.2 to 1 wt. %, based on the total weight of the polymerizable monomers in the composition.

Any suitable crosslinker may be optionally used in the present liquid composition. A suitable crosslinker may react with functional groups in the resin composition, including alkenes and Diels Alder dienes as chosen by one skilled in the art. Such suitable crosslinkers may include multifunctional thiols, multifunctional azides, multifunctional azirines, and bis-arylcyclobutene monomers as well as multifunctional dienophiles such as (meth)acrylates, maleimides, allyl compounds, vinyl silane compounds, or other suitable dienophiles, provided that they crosslink with the polymer of the present disclosure under the conditions used to cure the composition. The selection of such crosslinkers is within the ability of those skilled in the art. Such crosslinkers are typically used in an amount of from 0 to 30 wt. %, or from 0 to 15 wt. %, based on the total weight of the polymerizable monomers in the composition.

A variety of curing agents may be used in the liquid compositions of the present disclosure which are useful in photolithography. Suitable curing agents may aid in the curing of the bis-benzocyclobutene containing materials and may be activated by heat or light. Exemplary curing agents can include, but are not limited to, thermally generated initiators and photoactive compounds (photogenerated initiators). The selection of such curing agents is within the ability of those skilled in the art. Preferred thermal generated initiators are free radical initiators, such as, but not limited to, azobisisobutyronitrile, dibenzoyl peroxide, and dicumylperoxide. Preferred photoactive curing agents are free radical photoinitiators available from BASF under the Irgacure brand, and diazonaphthoquinone (DNQ) compounds including sulfonate esters of a DNQ compound. Suitable DNQ compounds are any compounds having a DNQ moiety, such as a DNQ sulfonate ester moiety, and that function as photoactive compounds in the present compositions, that is, they function as dissolution inhibitors upon exposure to appropriate radiation. Suitable DNQ compounds are disclosed in U.S. Pat. Nos. 7,198,878 and 8,143,360, the entire contents of which are incorporated herein by reference.

The amount of photoactive compound varies from 0 to 30 wt. %, based on the total weight of the polymer solids. When present, the photoactive compound is typically used in an amount of 5 to 30 wt. %, or from 5 to 25 wt. %, or from 10 to 25 wt. %, based on the total weight of polymer solids.

Any suitable adhesion promoter may be used in the liquid compositions of the present disclosure and the selection of such adhesion promoter is well within the ability of those skilled in the art. In some non-limiting examples, adhesion promoters are silane-containing materials or tetraalkyl titanates, or trialkoxysilane-containing materials. Exemplary adhesion promoters include, but are not limited to, bis (trialkoxysilylalkyl)benzenes such as bis(trimethoxysilylethyl)benzene; aminoalkyl trialkoxy silanes such as aminopropyl trimethoxy silane, aminopropyl triethoxy silane, and phenyl aminopropyl triethoxy silane; and other silane coupling agents, as well as mixtures of the foregoing. Adhesion promoters may be applied first as a primer layer or as an additive to the composition. Particularly suitable adhesion promoters include AP 3000, AP 8000, and AP 9000C, (DuPont de Nemours, Wilmington, DE). The liquid compositions of the present disclosure may contain from 0 to 15 wt. %, or from 0.5 to 10 wt. %, or from 1 to 10 wt. %, or from 2 to 10 wt. % of an adhesion promoter based on the total weight of the composition.

Any suitable flexibilizing agent or plasticizer may be used in the liquid compositions of the present disclosure and the selection of such is well within the ability of those skilled in the art. Exemplary flexibilizing agents include, but are not limited to, BMI 689 (Designer Molecules), diallyl phthalate and isomers, hexane diol diacrylate and other suitable materials that are liquid at a temperature of 25° C. A flexibilizing agent is used from 0-20 wt. %, or from 2-10 wt. %, or from 3-5% of the total non-volatile weight of the composition.

Any suitable flame retardant may be used in the liquid compositions of the present disclosure and the selection of such is well within the ability of those skilled in the art. Examples of the flame retardant may include an organic phosphorus-based flame retardant, an organic nitrogen-containing phosphorus compound, a nitrogen compound, a silicone-based flame retardant, and metal hydroxide. The organic phosphorus-based flame retardant may be a phenanthrene type phosphorus compound such as HCA, HCA-HQ, and HCA-NQ (SANKO CO., LTD.), a phosphorus-containing benzoxazine compound such as HFB-2006M (Showa High Polymer Co., Ltd.), a phosphate ester compound such as REOFOS 30, 50, 65, 90, 110, TPP, RPD, BAPP, CPD, TCP, TXP, TBP, TOP, KP140, and TIBP (Ajinomoto Fine-Techno Co., Inc.), TPPO and PPQ (HOKKO CHEMICAL INDUSTRY CO., LTD.), OP930 (Clariant Ltd.), and PX200 (DAIHACHI CHEMICAL INDUSTRY CO., LTD.), a phosphorus-containing epoxy resin such as FX289, FX305, and TX0712 (Tohto Kasei Co., Ltd.), a phosphorus-containing phenoxy resin such as ERF001 (Tohto Kasei Co., Ltd.), and a phosphorus-containing epoxy resin such as YL7613 (Japan Epoxy Resin Co., Ltd.).

The organic nitrogen-containing phosphorus compound may be a phosphate ester amide compound such as SP670 and SP703 (Shikoku Chemicals Corporation), a phosphazene compound such as SPB-100, SPV-100 and SPE-100 (Otsuka Chemical Co., Ltd.), and FP-series (FUSHIMI Pharmaceutical Co., Ltd.). Metal hydroxide may be magnesium hydroxide such as UD65, UD650, and UD653 (Ube Material Industries, Ltd.), and aluminum hydroxide such as B-30, B-325, B-315, B-308, B-303, and UFH-20 (Tomoe Engineering Co., Ltd.).

In some non-limiting embodiments, the content of the flame retardant is 0.5 to 10% by weight, and in some non-limiting embodiments 1 to 5% by weight, relative to 100% by weight of non-volatile components in the resin composition.

Any suitable surface leveling agent or 'leveling agent' may be used in the liquid compositions of the present disclosure and the selection of such is well within the ability of those skilled in the art. The leveling agent may contain a majority of silicone units derived from the polymerization of the following monomers $Si(R^1)(R^2)(OR^3)_2$ wherein $R^1$, $R^2$ or $R^3$ is each independently chosen from a $C_1$-$C_{20}$ alkyl or a $C_5$-$C_{20}$ aliphatic group or a $C_1$-$C_{20}$ aryl group. In one non-limiting embodiment, the leveling agent is non-ionic and may contain at least two functional groups that can chemically react with functional groups contained in the silicon and non-silicon resins under a cationic photo curing process or thermal curing condition. A leveling agent containing non-reactive groups is present in some non-limiting embodiments. In addition to silicon-derived units the leveling agent may comprise units derived from the polymerization of an $C_3$-$C_{20}$ aliphatic molecule comprising an oxirane ring. In addition, the leveling agent may comprise units derived from an $C_1$-$C_{50}$ aliphatic molecule comprising a hydroxyl group. In some non-limiting embodiments, the leveling agent is free of halogen substituents. In some non-limiting embodiments, the molecular structure of the leveling agent is predominantly linear, branched, or hyper-branched, or it may be a graft structure.

In some non-limiting embodiments; the leveling agent is selected from the group consisting of, AD1700, MD700; Megaface F-114, F-251, F-253, F-281, F-410, F-430, F-477, F-510, F-551, F-552, F-553, F-554, F-555, F-556, F-557, F-558, F-559, F-560, F-561, F-562, F-563, F-565, F-568, F-569, F-570, F-574, F-575, F-576, R-40, R-40-LM, R-41, R-94, RS-56, RS-72-K, RS-75, RS-76-E, RS-76-NS, RS-78, RS-90, DS-21 (DIC Sun Chemical); KY-164, KY-108, KY-1200, KY-1203 (Shin Etsu); Dowsil 14, Dowsil 11, Dowsil 54, Dowsil 57, Dowsil FZ2110, FZ-2123; Xiameter OFX-0077; ECOSURF EH-3, EH-6, EH-9, EH-14, SA-4, SA-7, SA-9, SA-15; Tergitol 15-S-3, 15-S-5, 15-S-7, 15-S-9, 15-S-12, 15-S-15, 15-S-20, 15-S-30, 15-S-40, L61, L-62, L-64, L-81, L-101, XD, XDLW, XH, XJ, TMN-3, TMN-6, TMN-10, TMN-100X, NP-4, NP-6, NP-7, NP-8, NP-9, NP-9.5, NP-10, NP-11, NP-12, NP-13, NP-15, NP-30, NP-40, NP-50, NP-70; Triton CF-10, CF-21, CF-32, CF76, CF87, DF-12, DF-16, DF-20, GR-7M, BG-10, CG-50, CG-110, CG-425, CG-600, CG-650, CA, N-57, X-207, HW 1000, RW-20, RW-50, RW-150, X-15, X-35, X-45, X-114, X-100, X-102, X-165, X-305, X-405, X-705; PT250, PT700, PT3000, P425, P1000 TB, P1200, P2000, P4000, 15-200 (Dow Chemical); DC ADDITIVE 3, 7, 11, 14, 28, 29, 54, 56, 57, 62, 65, 67, 71, 74, 76, 163 (Dow Silicones); TEGO Flow 425, Flow 370, Glide 100, Glide 410, Glide 415, Glide 435, Glide 432, Glide 440, Glide 450, Flow 425, Wet 270, Wet 500, Rad 2010, Rad 2200 N, Rad 2011, Rad 2250, Rad 2500, Rad 2700, Dispers 670, Dispers 653, Dispers 656, Airex 962, Airex 990, Airex 936, Airex 910 (Evonik); BYK-300, BYK-301/302, BYK-306, BYK-307, BYK-310, BYK-315, BYK-313, BYK-320, BYK-322, BYK-323, BYK-325, BYK-330, BYK-331, BYK-333, BYK-337, BYK-341, BYK-342, BYK-344, BYK-345/346, BYK-347, BYK-348, BYK-349, BYK-370, BYK-375, BYK-377, BYK-378, BYK-UV3500, BYK-UV3510, BYK-UV3570, BYK-3550, BYK-SILCLEAN 3700, Modaflow® 9200, Modaflow® 2100, Modaflow® Lambda, Modaflow® Epsilon, Modaflow® Resin, Efka FL, Additiol XL 480, Additol XW 6580, and BYK-SILCLEAN 3720.

In some non-limiting embodiments, the leveling agent can be present in an amount of from 0 to 1 wt %, or from 0.001 to 0.9 wt %, or from 0.05 to 0.5 wt %, or from 0.05 to 0.25 wt %, or from 0.05 to 0.2 wt %, or from 0.1 to 0.15 wt %.

Photolithographic liquid compositions of the present disclosure may be prepared by combining one or more polymers of the present disclosure, any organic solvents, water or additional components and a photoactive compound as a curing agent in any order. The organic solvents are the same as those described above. When the present compositions contain the photoactive compound, such as a diazonaphthoquinone, an onium salt or photoinitiator, it is preferred that the curing agent is first dissolved in a suitable organic solvent or aqueous alkali, then combined with one or more present polymers and any optional surfactant, and then combined with any optional adhesion promoter. Selection of a suitable photoactive compound is within the ordinary level of skill in the art.

In some embodiments, the liquid compositions of the present disclosure may be coated or deposited on a substrate by any suitable method. The substrates are the same as those described above. Suitable methods for coating the present compositions can include, but are not limited to, spin-coating, curtain coating, spray coating, roller coating, dip coating, vapor deposition, and lamination such as vacuum lamination and hot roll lamination, among other methods. In the semiconductor manufacturing industry, spin-coating is a preferred method to take advantage of existing equipment and processes. In spin-coating, the solids content of the composition may be adjusted, along with the spin speed, to achieve a desired thickness of the composition on the surface to which it is applied.

When the liquid compositions of the present disclosure do not contain an adhesion promoter, the surface of the substrate to be coated with the present compositions may optionally first be contacted with a suitable adhesion promoter or vapor treated. Various vapor treatments known in the art may increase the adhesion of the polymers of the present disclosure to the substrate surface, such as plasma treatments. In certain applications, it may be preferred to use an adhesion promoter to treat the substrate surface prior to coating the surface with the present compositions. The adhesion promoter is the same as those described above.

Typically, the liquid compositions of the present disclosure are spin-coated at a spin speed of 400 to 4000 rpm. The amount of the present compositions dispensed on the wafer or substrate depends on the total solids content in the composition, the desired thickness of the resulting layer, and other factors well-known to those skilled in the art. When a film or layer of the present compositions is cast by spin-coating, much (or all) of the solvent evaporates during deposition of the film. Preferably, after being disposed on a surface, the composition is heated (soft-baked) to remove any remaining solvent. Typical baking temperatures are from 90 to 120° C., although other temperatures may be suitably used. Such baking to remove residual solvent is typically done for approximately one or two minutes, although longer or shorter times may suitably be used.

The resin compositions of the present disclosure are typically cured by heating for a period of time. Suitable curing temperatures range from 140 to 300° C.; or from 170 to 250° C. Typically curing times range from 1 to 600 minutes, or from 30 to 240 minutes, or from 30 to 120 minutes.

Generally, the thickness of the formed resin composition layer is equal to or more than the thickness of the conductive layer. Since the thickness of the conductive layer in the circuit substrate is generally within a range of 5-70 µm, the resin composition layer generally has a thickness of 10-100 µm.

In one embodiment, the liquid compositions comprising the polymer described herein can be spin cast onto copper. The composition can be cast via a slot die coater or other suitable apparatus to form a dry film desirable for microelectronic applications. The cast films can be soft baked to remove residual solvent for 30 seconds to 10 minutes at temperatures of 70-150° C., or of 90-120° C. The soft baked film can then be subjected to a curing condition of 150-250° C. for 30 minutes to 4 hours.

In some embodiments, layers of the liquid compositions of the present disclosure may also be formed as a dry film and disposed on the surface of a substrate by lamination. In lamination-based processes when the adhesive film has a protective film with thickness between 1-40 µm; the protective film is first removed, then the adhesive film and the circuit substrate are preheated, if desired, and the adhesive film is compression-bonded to the circuit substrate while pressing and heating. In some non-limiting embodiments, there is suitably adopted a method in which the adhesive film is laminated on the circuit substrate under reduced pressure by a vacuum lamination method. Non-limiting lamination conditions can include: a compression bonding temperature (lamination temperature) of 70-140° C., a compression bonding pressure of 1-11 kgf/cm$^2$ (9.8×10$^4$-107.9×10$^4$ N/m$^2$), and a reduced pressure of 20 mmHg (26.7 hPa) or less in terms of a pneumatic pressure. The lamination method may be batch- or continuous-mode using rolls. The vacuum lamination can be performed using a commercially available vacuum laminator. Examples of the commercially available vacuum laminator include a vacuum applicator manufactured by Nichigo-Morton Co., Ltd., a vacuum pressure laminator manufactured by Meiki Co., Ltd., a roll type dry coater manufactured by Hitachi Industries Co., Ltd., and a vacuum laminator manufactured by Hitachi AIC Inc.

The lamination step of performing heating and pressing under reduced pressure can be carried out using a general vacuum hot press machine. For example, the lamination step can be carried out by pressing a metal plate such as a heated SUS plate from a support layer side. Lamination is generally done under a reduced pressure of 1×10$^{-2}$ MPa or less, and in some non-limiting embodiments 1×10$^{-3}$ MPa or less. Although the heating and pressing can be performed in a single stage, it is generally advantageous to perform the heating and pressing separately by two or more stages so as to control bleeding of the resin. For example, the first-stage pressing may be performed at a temperature of 70-150° C.

under a pressure of 1-15 kgf/cm² and the second-stage pressing may be performed at a temperature of 150-200° C. under a pressure of 1-40 kgf/cm². In some non-limiting embodiments, the pressing is performed at each stage for a period of 30-120 minutes. Examples of a commercially-available vacuum hot pressing machine include MNPC-V-750-5-200 (Meiki Co., Ltd.) and VH1-1603 (KITAGAWA SEIKI CO., LTD.).

The insulating layer can be formed on the circuit substrate by laminating the adhesive film on the circuit substrate, cooling the laminate to about room temperature, releasing the support in the case of releasing the support, and then thermally curing the resin composition layer. The appropriate condition for the thermal curing may be selected depending on the kind and content of each resin component in the resin compositions disclosed herein. In some non-limiting embodiments; the temperature and time for the thermal curing is selected from a range between 150-220° C. for 20-180 minutes, and in some non-limiting embodiments from a range between 160-210° C. for 30-120 minutes.

After forming the insulating layer, the support is then released in situations where the support had not been released before curing. Thereafter, the insulating layer formed on the circuit substrate is perforated as necessary to form a via hole or a through-hole. The perforation can be performed, for example, by a one or more methods known to those with skill in the art including drill, laser, plasma, or the like. In some non-limiting embodiments, perforation is achieved using a laser such as a carbon dioxide gas laser or a YAG laser.

Subsequently, the conductive layer is formed on the insulating layer by dry plating or wet plating. Non-limiting examples of dry plating methods include vapor deposition, sputtering, and ion plating. For wet plating, the surface of the insulating layer is sequentially subjected to a swelling treatment with a swelling solution, a roughening treatment with an oxidant, and a neutralization treatment with a neutralization solution to form convex-concave anchor. The swelling treatment with the swelling solution can be performed by immersing the insulating layer into the swelling solution at 50-80° C. for 5-20 minutes. Non-limiting examples of the swelling solution include an alkali solution and a surfactant solution. Examples of the alkali solution may include a sodium hydroxide solution and a potassium hydroxide solution. Commercially available swelling solution include Swelling Dip Securiganth P and Swelling Dip Securiganth SBU, (Atotech Japan K. K.). The roughening treatment with an oxidant can be performed by immersing the insulating layer into an oxidant solution at 60-80° C. for 10-30 minutes. Non-limiting examples of the oxidant include an alkaline permanganate solution in which potassium permanganate or sodium permanganate is dissolved in an aqueous solution of sodium hydroxide, dichromate, ozone, hydrogen peroxide/sulfuric acid, and nitric acid. The concentration of permanganate in an alkaline permanganate solution may be approximately 5 to 10% by weight. Examples of a commercially available oxidant include an alkaline permanganate solution such as Concentrate Compact CP and Dosing Solution Securiganth P (Atotech Japan K. K.). The neutralization treatment with a neutralization solution can be performed by immersing the insulating layer into the neutralization solution at 30-50° C. for 3-10 minutes. In some non-limiting examples, the neutralization solution can be an acidic aqueous solution. Examples of a commercially available neutralization solution include Reduction Solution Securiganth P (Atotech Japan K. K.).

The conductive layer may alternatively be formed by forming a plating resist with a reverse pattern of the conductive layer and performing only electroless plating. As a subsequent patterning method, a subtractive method or a semi-additive method may be used which are known to those skilled in the art.

The present disclosure is also directed to a wide variety of electronic devices comprising at least one layer of the dielectric films of the present application on an electronic device substrate. The electronic device substrate can be any substrate for use in the manufacture of any electronic device. Exemplary electronic device substrates include, without limitation, semiconductor wafers, glass, sapphire, silicate materials, silicon nitride materials, silicon carbide materials, display device substrates, epoxy mold compound wafers, circuit board substrates, and thermally stable polymers.

As used herein, the term "semiconductor wafer" is intended to encompass a semiconductor substrate, a semiconductor device, and various packages for various levels of interconnection, including a single-chip wafer, multiple-chip wafer, packages for various levels, substrates for light emitting diodes (LEDs), or other assemblies requiring solder connections. Semiconductor wafers, such as silicon wafers, gallium-arsenide wafers, and silicon-germanium wafers, may be patterned or unpatterned. As used herein, the term "semiconductor substrate" includes any substrate having one or more semiconductor layers or structures which include active or operable portions of semiconductor devices. The term "semiconductor substrate" is defined to mean any construction comprising semiconductive material, such as a semiconductor device. A semiconductor device refers to a semiconductor substrate upon which at least one microelectronic device has been or is being fabricated. Thermally stable polymers include, without limitation, any polymer stable to the temperatures used to cure the arylcyclobutene material, such as polyimide, for example, KAPTON™ polyimide (DuPont, Wilmington, DE), liquid crystalline polymers, for example VECSTAR™ LCP film (Kuraray, Tokyo, Japan) and Bismaleimide-Triazine (BT) resins (MGC, Tokyo, Japan). Additional polymeric substrates can include polyolefins such as polyethylene, polypropylene and polyvinyl chloride; a film of polyester such as polyethylene terephthalate (hereinafter may be abbreviated as "PET") and polyethylene naphthalate, or a polycarbonate film. Further, a release paper, a metal foil such as a copper foil and an aluminum foil, and the like, can be used. The support and a protective film to be described later may be subjected to a surface treatment such as a mat treatment and a corona treatment. Alternatively, the support and the protective film may be subjected to a release treatment with a release agent such as a silicone resin-based release agent, an alkyd resin-based release agent, or a fluororesin-based release agent. In some non-limiting embodiments; the support has a thickness of 10-150 μm, and in some non-limiting embodiments 25-50 μm.

EXAMPLES

Materials:

Monomers and other components were acquired/prepared as follows: 3-myrcene (Vigon), styrene (Sigma Aldrich), vinyl toluene isomeric mixture (Deltech Corporation), Vazo 65 initiator (Wako Chemical), 4-vinyl pyridine (Vertellus, used as received), bismaleimides BMI-689 (Designer Molecules), SPV-100 (Otsuka Chemical Company, used as received), spherical silica with average particle diameter of 0.5 μm ("SC2050-MTM" from Admatechs Company Limited, used as received). Vinyl phenoxy BCB [1-(4-vinylphenoxy)benzocyclobutene)] was prepared according to US Pat. Application No. 20190169327A1, the entire contents of which are incorporated herein by reference. Phenolic resins were obtained from Meiwa Plastics Limited, DIC Corporation, or Nippon Kayaku Company Limited as appropriate and used as received. All other solvents and chemicals were received from Fisher Scientific and used as received without additional purification.

Molecular Weight Determination:

Polymer samples were prepared as a 0.5 wt. % solution in tetrahydrofuran and filtered through a 0.2-micron Teflon filter. The mobile phase was 0.5% triethylamine, 5% methanol and 94.5% tetrahydrofuran. The columns used were Waters Styragel HRSE 7.8×300 mm column lot number 0051370931. Injection volume was 100 microliters and run time was 27 minutes. Molecular weight data is reported relative to polystyrene standards.

Film Sample Preparation and Processing:

Formulation solutions were draw-down coated onto a PET substrate (NANYA NV38G, 38 µm thickness) via a steel bar with a 6-mil gap. Films were soft-baked at 115° C. for 3 minutes. Films were laminated onto a suitable substrate via a Meiki (MVLP 500/600) Laminator using a first stage vacuum of approximately 2 hPa for 30 seconds, a temperature of 90° C. with a pressure of 0.95 MPa using a rubber contact; and a second stage with a steel plate using a pressure of 1.5 MPa temperature of 90° C. for 1 minute. For freestanding film samples, samples were then cured in a BlueM oven at 180° C. for one hour under nitrogen, less than 100 ppm of oxygen, on a copper substrate. The resulting substrate was cleaved into suitable sizes and films were lifted in a water or 5% ammonium sulfate in water bath, rinsed and dried to obtain free standing films for analysis.

Test Methods (1) Dielectric Properties:

The IPC test method TM-650 2.5.5.13 (rev. 01/07) was used to determine dielectric properties of free-standing films using copper split cylinder resonators machined such that they possessed having an empty cavity frequency of 10 GHz each and a Keysight N5224A PNA network analyzer. The film geometry was such that the substrate extended beyond the diameter of the two cylindrical cavity sections. Although the dielectric substrate thickness can vary from 0.01 mm to 5.0 mm, a substrate thickness of 0.03 mm was used in these studies. Free-standing films were placed in the cavity of the split cylinder resonator and the resonant frequency and quality factor of the $TE_{011}$ resonant mode were measured using the network analyzer. Relative permittivity (Dk) and loss tangent (Df) of the films were calculated from the $TE_{011}$ resonant mode using custom software written in MATLAB.

(2) Thermomechanical and Gravimetric Analysis:

Free standing films were cleaved into 10 mm by 25 mm geometry and placed in a TA Instruments dynamic mechanical analyzer Q800 instrument at a strain rate of 0.06%, preload force of 1 newton and a frequency of 1 hertz. The temperature was equilibrated at 50° C. then increased to 200° C. at a rate of 5° C. per minute. The glass transition temperature value was taken as the maximum value of the curve of tan δ. Water absorption was obtained via thermogravimetric analysis TA Instruments Q5000 SA, using a condition of mass increase 60° C. at 60% relative humidity. Thermomechanical analysis was performed on a TA Instruments Thermomechanical Analyzer Q400 in a tensile mode. Samples were heated at a rate of 5° C. to 280° C., then brought down to −50° C., then back up to 250° C. at the same rate. The coefficient of thermal expansion was determined to be the linear change in dimension from −25° C. to 50° C. in the last cycle.

Peel Testing (1) Roughening Treatment

Surface roughening of the substrate was carried out via a 3-step desmear procedure. The sample was first immersed in CIRCUPOSIT™ Sweller 7810, available from DuPont de Nemours, for 20 minutes at 70° C. The sample was then rinsed under a strong stream of water for 2 minutes to remove excess sweller solution. This was followed by immersion in CIRCUPOSIT™ MLB Promoter 3308 aqueous permanganate solution, available from DuPont de Nemours, at 80° C. for variable lengths of time. After rinsing under water for 2 minutes, any remaining promoter precipitate was removed via immersion of the sample in CIRCUPOSIT™ Neutralizer 216, available from DuPont de Nemours, at 40° C. for 5 minutes. After a final rinse under a strong stream of water for 2 minutes, the samples were dried under a stream of air. Degree of texturization was determined by measuring the mass difference of the substrate before and after desmear, normalized by the surface area of the sample.

(2) Electroless Plating

Desmeared samples were prepared for electroless deposition by first immersing the substrate in CIRCUPOSIT™ Conditioner 8512, available from DuPont de Nemours, at 40° C. for 5 minutes, followed by a 2-minute rinse under a strong stream of water. The samples were then dipped a 3% nitric acid solution in water for 30 seconds at room temperature. Immediately after, the samples were immersed into CIRCUPOSIT™ 6530 Catalyst, available from DuPont de Nemours, which is an ionic aqueous alkaline palladium catalyst for 5 minutes at 40° C. The catalyst is buffered with sufficient amounts of sodium carbonate, sodium hydroxide or nitric acid to achieve a catalyst pH of 9-9.5. The samples were then rinsed under a strong stream of water for 2 minutes at room temperature. The panels were then immersed into a 0.6 g/L dimethylamine borane and 5 g/L boric acid solution at 30° C. for 2 minutes to reduce the palladium ions to palladium metal, followed by rinsing under a strong stream of water for 2 minutes. The activated samples were then immersed into the electroless copper plating bath CIRCUPOSIT™ 6550, available from DuPont de Nemours, for 5 minutes at 35° C. Copper was thus deposited conformally across the entirety of the sample to a target copper thickness of 0.4 µm. The metallized samples were then rinsed under a strong stream of water and immediately dried under a steam of air. The samples were finally soft-baked at 120° C. for 30 minutes under a N2 atmosphere in order to anneal the electroless copper deposit and remove residual water from the deposit.

(3) Electrolytic Plating

Metallized samples were prepared for electroplating by immersing in RONACLEAN™ LP-200, available from DuPont de Nemours, for 1.5 minutes at 35° C. The samples were then rinsed under a stream of water for 2 minutes and any residual surface oxide was removed through immersion in a 10% sulfuric acid solution in water at room temperature for 30 seconds. Samples were then placed in a Haring cell containing copper electroplating bath MICROVIA™ EVF-II, available from DuPont de Nemours, as the electrolyte and two insoluble anodes. Solution agitation was provided via bubbling outlets at either side of the sample. Electroplating was carried out at 20 ASF for 50 minutes to reach a target plating thickness of 18 µm. The brightener plating additive was periodically replenished during plating to sustain the initial concentration, based on prior analysis of consumption rates in this electroplating setup. Once electroplating was concluded, the samples were removed from the Haring cell and rinsed under a strong stream of water. The samples were then immersed in a basic anti-tarnish solution containing benzotriazole to protect the surface from oxidation. The samples were finally baked at 180° C. for 1 hour under a N2 atmosphere to anneal the copper deposit and complete the curing of the under-laying dielectric film.

(4) Plated Peel Testing

Once plated copper samples had been annealed, peel strips were scored on the coupon one centimeter wide with a suitable blade, then the copper strip was peeled off at a ninety-degree angle on an Intron tensile tester at a rate of 50 mm/min. The peel force value in kilogram force per centimeter was calculated. For samples undergoing highly accelerated stress test (HAST), the scored coupons were subjected to an atmosphere of 130° C. at 85% relative humidity for 50 hours, at which point the same peel test was performed and values were recorded. A value below 0.15 kgf/cm was considered not good, a value above 0.15 kgf/cm was considered good.

Example A1 (Synthesis of Arylcyclobutene Resin)

The following monomers and solvent were added to a 100 L jacketed reactor with overhead stirring and heat to 79° C. under a nitrogen blanket: 19695.8 g 1-(4-vinylphenoxy) benzocyclobutene, 15090.5 g vinyl toluene, 1517.7 g vinyl pyridine, 8445.6 g beta-myrcene and 19178.4 g cyclopentanone. An initiator feed of 1401.1 g V65 and 17131.5 g cyclopentanone was fed at a constant rate into the reactor 20 hours, and temperature was held for an additional 3 hours before returning to 40 C. The solution was used directly in formulation examples. GPC Mn 7.4 k, Mw 33.5 k Example B1 (Synthesis of Aryl Ether Resin B1)

The following generalized procedure was used for synthesis of allylic resins: To a 250-ml round bottom flask equipped with stir bar and reflux condenser under a nitrogen blanket, 10 g of MEH-7500 from Meiwa Plastic Industries Ltd. (phenol benzaldehyde copolymer, 110 OH eq weight) was added and dissolved in acetonitrile (40 g, four times the mass of phenolic resin). When dissolution was complete, potassium carbonate (18.85 g, 1.5 eq relative to OH equivalent weight) was added, and the resultant slurry was heated to 80° C. for one hour. Subsequently, allyl bromide (8.64 ml, 1.1 eq relative to OH equivalent weight) was added via syringe over fifteen minutes. The mixture continued to stir at 80° C. for 16 hours. Subsequently, the solution was cooled to room temperature, and dichloromethane (80 grams, eight times the mass of phenolic resin) and water (80 grams, eight times the mass of the phenolic resin) were added and the mixture was stirred for one hour. The mixture was the transferred to a separatory funnel, where the organic layer was collected, dried with magnesium sulfate (40 grams, four times the mass of phenolic resin) and filtered. The remaining solvent was removed in vacuo.

The B1 product was received as a dark red viscous oil at 87% yield of expected product. The structure was confirmed by proton NMR using deuterated dimethyl sulfoxide as a solvent in a 500 MHz field. Compared with the starting material, phenol —OH resonances at 9.0-10.0 ppm could no longer be detected, while resonances at 5.9-6.3 ppm (1H), 5.1-5.4 ppm (2H) and 4.3-4.5 ppm (2H) were observed, consistent with a phenolate ether structure.

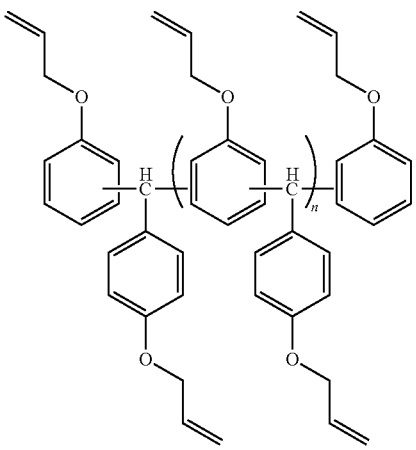

Example B2 (Synthesis of Aryl Ether Resin B2)

An identical procedure to synthesis example B1 was used, except TD-2090 from DIC Corporation with a phenol equivalent weight of 105 was used (phenol formaldehyde copolymer). NMR verification was performed in the same manner as for example B1 and yielded a result consistent with a phenolate ether structure. The material was isolated as a red viscous oil, 86% yield.

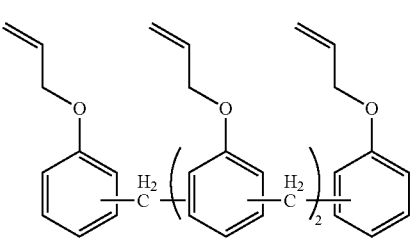

Example B3 (Synthesis of Aryl Ether Resin B3)

An identical procedure to synthesis example B1 was used, except GPH-103 from Nippon Kayaku Ltd. (biphenyl/phenol formaldehyde copolymer) with a phenol equivalent weight of 232 was used. NMR verification was performed in the same manner as for example B1 and yielded a result consistent with a phenolate ether structure. The material was isolated as a light red viscous oil, 89% yield.

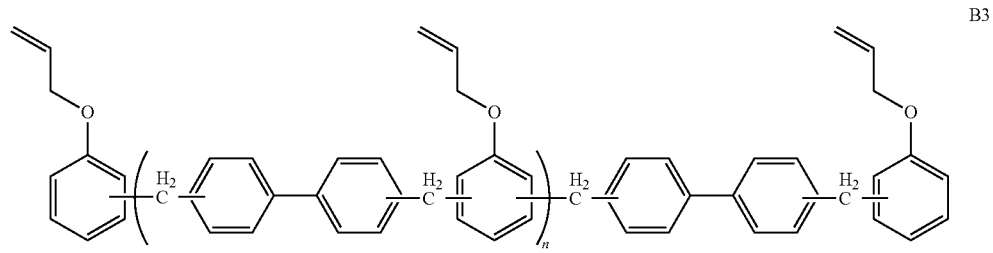

B3

Example B4 (Synthesis of Aryl Ether Resin B4)

An identical procedure to synthesis example B1 was used, except VH-4170 from DIC Corporation (bisphenol-A formaldehyde copolymer) with a phenol equivalent weight of 232 was used. NMR verification was performed in the same manner as for example B1 and yielded a result consistent with a phenolate ether structure. The material was isolated as a colorless viscous oil, 95% yield.

Example B5 (Synthesis of Aryl Ether Resin B5)

An identical procedure to synthesis example B1 was used, except KA-1163 from DIC Corporation (cresol formaldehyde copolymer) with a phenol equivalent weight of 118 was used. NMR verification was performed in the same manner as for example B1 and yielded a result consistent with a phenolate ether structure. The material was isolated as a light red viscous oil, 91% yield.

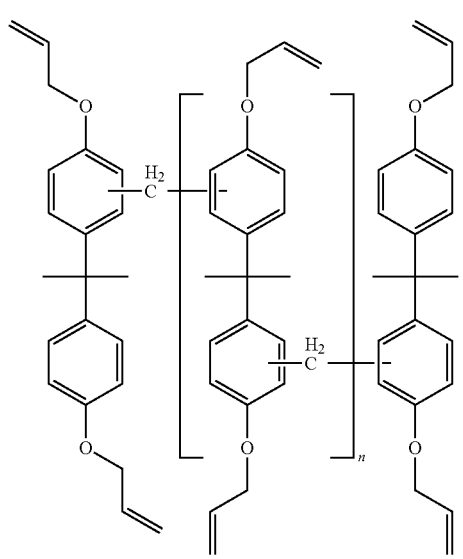

B4

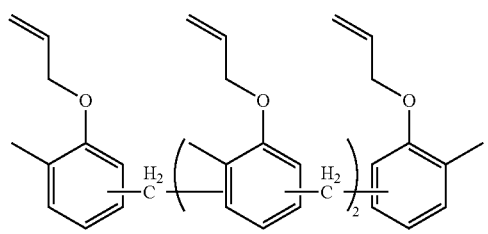

B5

Example B6 (Synthesis of Aryl Ether Resin B6)

An identical procedure to synthesis example B1 was used, except MEH-7000 from Meiwa Plastic Industries Ltd. (naphthalene/phenol formaldehyde copolymer) with a phenol equivalent weight of 145 was used. NMR verification was performed in the same manner as for example B1 and yielded a result consistent with a phenolate ether structure. The material was isolated as a dark red viscous oil, 81% yield.

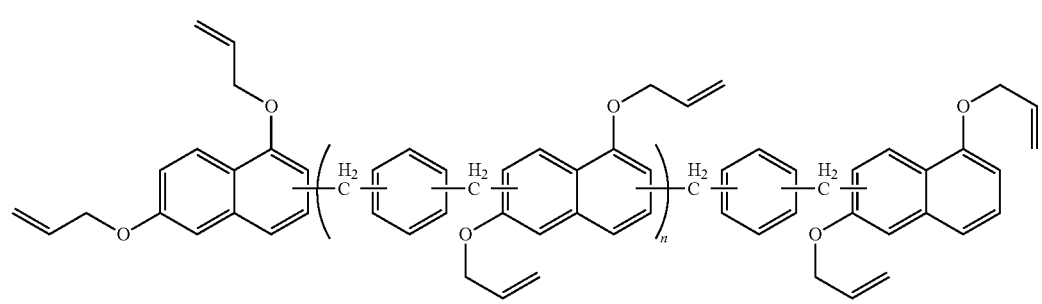

B6

Example B7 (Synthesis of Comparative Phenolate Methacrylic Ester Resin B7)

To a 250 ml round bottom flask equipped with stir bar and reflux condenser under a nitrogen blanket, 10 g of DL-92 from Meiwa Plastic Industries Ltd. (phenol formaldehyde copolymer, 109 OH eq weight) and 0.56 g of dimethyl aminopyridine (0.05 eq relative to OH eq weight) were added and dissolved in dichloromethane (20 g, two times the mass of phenolic resin). When dissolution was complete, methacrylic anhydride (19.54 ml, 1.15 eq relative to OH equivalent weight) was added via syringe, and the resultant mixture was stirred at room temperature for 16 hours. Subsequently, dichloromethane (80 grams, eight times the mass of phenolic resin) and saturated sodium bicarbonate solution in water (200 grams, twenty times the mass of the phenolic resin) were added along with the reaction mixture to a separatory funnel. The funnel was agitated and then layers were allowed to separate. The organic layer was collected, dried with magnesium sulfate (40 grams, four times the mass of phenolic resin) and filtered. The remaining solvent was removed in vacuo. The product was received as a red viscous oil at 95% yield of expected product.

The structure was confirmed by proton NMR using deuterated dimethyl sulfoxide as a solvent in a 500 MHz field. Compared with the starting material, phenol —OH resonances at 9.0-10.0 ppm could no longer be detected, while resonances at ~6.3 ppm (1H), ~6.0 ppm (1H) and ~2.0 ppm (3H) were observed, consistent with a phenolate methacrylic ester structure. The material was isolated as a colorless viscous oil, 95% yield.

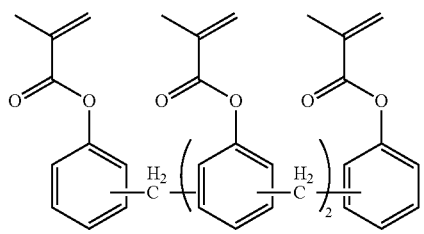

B7

Example B8 (Synthesis of Comparative Phenolate Vinyl Benzyl Resin B8)

An identical procedure to synthesis example B1 was used, except DL92 from Meiwa Plastic Industries Ltd. (phenol formaldehyde copolymer copolymer) with a phenol equivalent weight of 109 was used and vinyl benzyl chloride was used in place of allyl bromide. NMR verification of structure confirmed the disappearance of phenol OH peak and the appearance of broad resonances at ~6.7 ppm (1H), ~5.8 ppm (1H), ~5.3 ppm (1H) and ~5.0 ppm (2H) consistent with a phenolate vinyl benzyl structure. The material was isolated as a dark red viscous oil, 91% yield

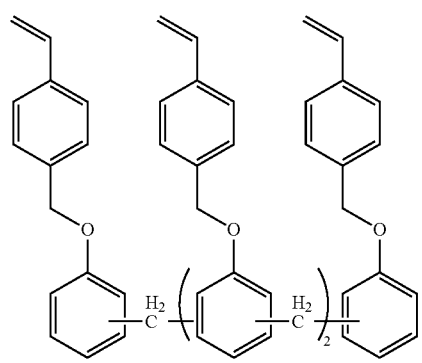

B8

Example B9 (Synthesis of Comparative Methacrylate Ester Resin B9)

An identical procedure to synthesis example B7 was used, except MEH7500 from Meiwa Plastic Industries Ltd. (phenol benzaldehyde copolymer copolymer) with a phenol equivalent weight of 110 was used. NMR verification was performed in the same manner as for example B7, and the results were consistent with a methacrylate ester structure. The material was isolated as a red viscous oil, 95% yield.

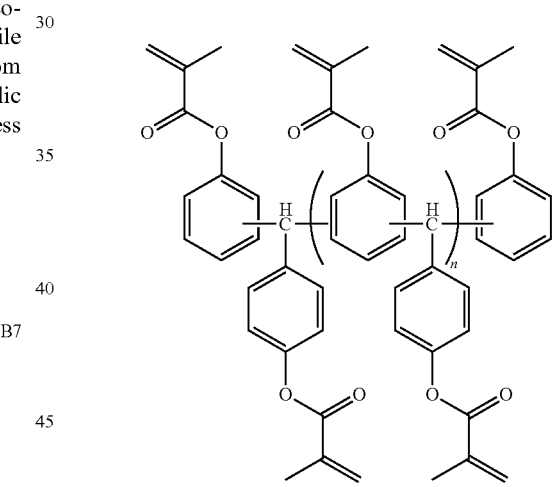

B9

Example B10 (Synthesis of Comparative Resin B10)

The synthesis of the adduct of benzocyclobutene carboxylic acid chloride and Neaollyl P30 was carried out according to U.S. Pat. No. 10,030,165 B2.

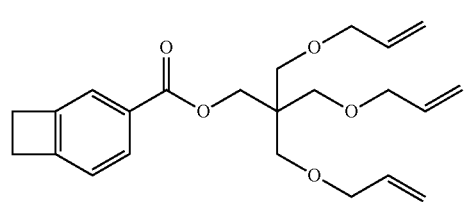

B10

Formulation and Film Preparation
(1) Formulation and Film Example 1

To a 20-ml glass vial vessel, 72 parts of benzocyclobutene resin A1, 18 parts allylic resin B1, 7 parts of flame retardant C1 SPV-100 from Otsuka Chemical Co., Ltd., 2 parts of flexibilizing agent D1 BMI-689 from Designer Molecules Inc., 0.35 parts of surfactant E1 Modaflow® Resin from Allnex, 224 parts of spherical silica with methacrylic functionality F1 SC2050-MTM from Admatechs Company Limited, and volatile components 2-butanone G1 96 parts with cyclopentanone G2 83 parts. The mixture was rolled overnight to combine, and then the resultant solution was used to produce films as described herein for evaluation.

(2) Formulation and Film Examples 2-9 and Comparative Examples 1-4

Formulation and Film Examples 2-9 and Comparative Examples 1-4 were prepared using an analogous procedure to that described for Example 1 with the compositions as noted in Table 1. The corresponding film test data are presented in Table 2.

TABLE 1

Formulation Non-Volatiles/Film Composition

| Example | Weight % | | |
|---|---|---|---|
| | BCB Resin[1] | Second Resin[2] | Additive Package[3] |
| 1 | 72 | 18 B1 | 9.35 |
| 2 | 75 | 15 B1 | 9.35 |
| 3 | 69 | 21 B1 | 9.35 |
| 4 | 72 | 18 B2 | 9.35 |
| 5 | 72 | 18 B3 | 9.35 |
| 6 | 72 | 18 B4 | 9.35 |
| 7 | 72 | 18 B5 | 9.35 |
| 8 | 75 | 15 B6 | 9.35 |
| 9 | 72 | 18 B6 | 9.35 |
| Comp. 1 | 72 | 18 B7 | 9.35 |
| Comp. 2 | 72 | 18 B8 | 9.35 |
| Comp. 3 | 72 | 18 B9 | 9.35 |
| Comp. 4 | 72 | 18 B10 | 9.35 |

[1]BCB Resin: arylcyclobutene resin prepared in Example A1
[2]Second Resin: aryl ether or non-allyl resins prepared in Examples B1-B10
[3]Additive Package: flame retardant (SPV-100, Otsuka Chemical Co., Ltd; 7 weight %), flexibilizing agent (BMI-689, Designer Molecules, Inc.; 2 weight %), surfactant (Modaflow ® Resin, Allnex; 0.35 weight %).
Also present in formulations: spherical silica with methacrylic functionality (SC2050-MTM, Admatechs Company Limited, 224 parts), solvent 1 (2-butanone, 96 parts), solvent 2 (cyclopentanone, 83 parts).

While all resin formulations produce films with dielectric constants (Dk) and dielectric losses (Df) that are generally suitable for the electronics applications disclosed herein, only those formulations that include a second resin with an allyl group yield films with a plated peel strength of sufficient magnitude to make them useful in practice. Further, judicious selection of the allyl-based second monomer can lead to a reduction in Df.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. The use of numerical values in the various ranges specified herein is stated as approximations as though the minimum and maximum values within the stated ranges were both being preceded by the word "about." In this manner, slight variations above and below the stated ranges can be used to

TABLE 2

Film Test Data

| Example | CTE TMA (° C.) | DMA $T_g$ (° C.) | Water Abs. (%) | Dk 10 GHz | Df 10 GHz | Etch Rate Amount (mg/cm$^2$) | Plated Peel (kgf/cm) |
|---|---|---|---|---|---|---|---|
| 1 | 22 | 168 | 0.03 | 3.3 | 0.0021 | 0.0686 | 0.24 |
| 2 | 24 | 172 | 0.02 | 3.2 | 0.0015 | 0.0427 | 0.23 |
| 3 | 22 | 154 | 0.05 | 3.2 | 0.0024 | 0.0743 | 0.21 |
| 4 | 23 | 171 | 0.02 | 3.3 | 0.0019 | 0.0422 | 0.17 |
| 5 | 23 | 163 | 0.08 | 3.3 | 0.0016 | 0.0373 | 0.2 |
| 6 | 22 | 161 | 0.03 | 3.3 | 0.0016 | 0.0341 | 0.18 |
| 7 | 20 | 166 | 0.03 | 3.3 | 0.0019 | 0.0310 | 0.17 |
| 8 | 22 | 183 | 0.04 | 3.2 | 0.0015 | 0.0371 | 0.16 |
| 9 | 26 | 182 | 0.04 | 3.2 | 0.0015 | 0.0379 | 0.19 |
| Comp. 1 | 21 | 167 | 0.08 | 3.2 | 0.0021 | 0.2396 | 0.08 |
| Comp. 2 | 22 | 175 | 0.04 | 3.2 | 0.0021 | 0.0370 | 0.05 |
| Comp. 3 | 23 | 170 | 0.09 | 3.1 | 0.0019 | 0.0637 | 0.09 |
| Comp. 4 | 21 | 160 | 0.10 | 3.4 | 0.002 | 0.0551 | 0.08 |

What is claimed is:

1. A resin composition from a mixture comprising:
   (a) 60-90 weight % of at least one thermosetting resin based on total non-volatiles; and
   (b) 10-40 weight % of at least one aryl ether resin based on total non-volatiles, wherein the at least one thermosetting resin is an arylcyclobutene resin, and the at least one aryl ether resin is selected from the group consisting of Formula (B1)-Formula (B6)

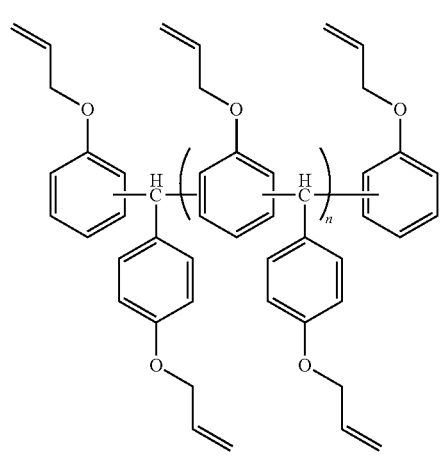

(B1)

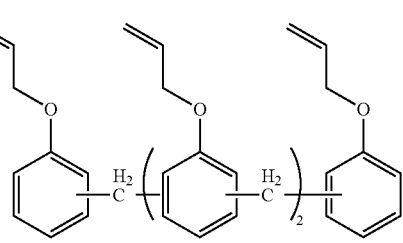

(B2)

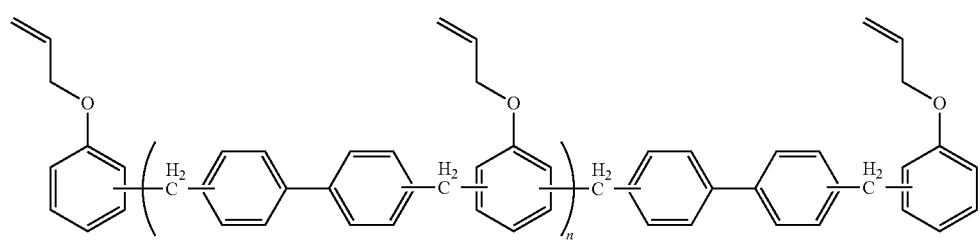

(B3)

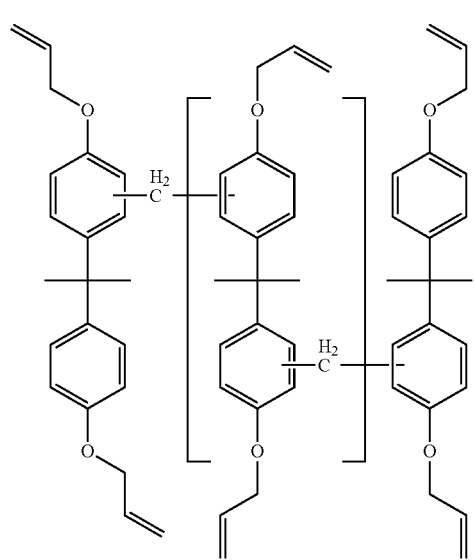

(B4)

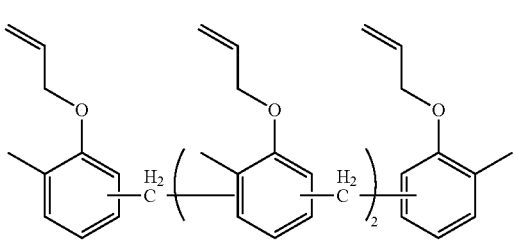

(B5)

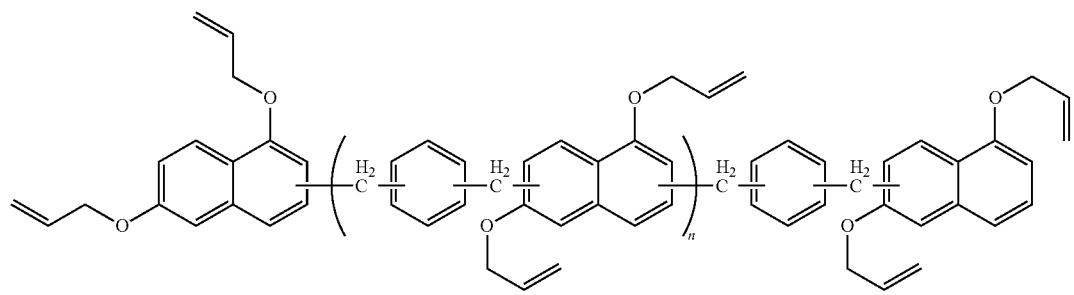

(B6)

where n=1 to 10.

2. The resin composition of claim 1, wherein the at least one arylcyclobutene resin comprises a polymerization product derived from a mixture comprising
   (a) 10-50 mol % of one or more addition polymerizable arylcyclobutene monomers and one or more monomers selected from the group consisting of:
   (b) 15-60 mol % of one or more dienophile monomers;
   (c) 15-50 mol % of one or more diene monomers; and
   (d) 0-10 mol % of one or more heterocycle containing monomers.

3. The resin composition of claim 2, wherein the one or more addition polymerizable arylcyclobutene monomers has a structure selected from the group consisting of Formula (A-1), Formula (A-2), and Formula (A-3):

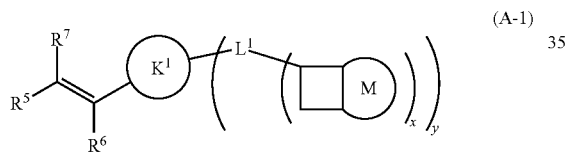
(A-1)

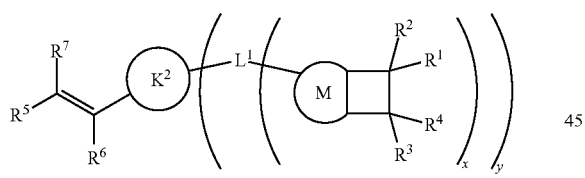
(A-2)

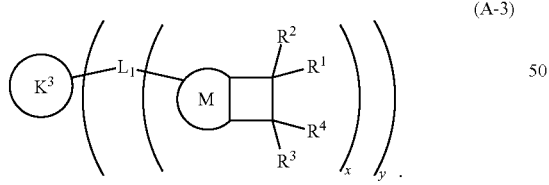
(A-3)

where:

$K^1$ is a divalent group selected from the group consisting of alkyl, aryl, carbocyclic aryl, polycyclic aryl, heteroaryl, aryloxy, arylalkyl, carbonyl, ester, carboxyl, ether, thioester, thioether, tertiary amine, and combinations thereof;

$K^2$ is a single bond or a divalent group selected from the group consisting of alkyl, aryl, carbocyclic aryl, polycyclic aryl, heteroaryl, aryloxy, arylalkyl, carbonyl, ester, carboxyl, and ether, thioester, thioether, tertiary amine, and combinations thereof;

$K^3$ is a polymerizable functional group;

$L^1$ is a covalent bond or a multivalent linking group;

M is a substituted or unsubstituted divalent aromatic radical group, or a substituted or unsubstituted divalent heteroaromatic radical group;

$R^1$-$R^4$ are the same or different and are independently selected from the group consisting of substituted or unsubstituted alkyl, substituted or unsubstituted alkyloxy, substituted or unsubstituted aryl, substituted or unsubstituted aryloxy, akylthio, arylthiol, substituted alkyl amino, and substituted aryl amino;

$R^5$-$R^7$ are the same or different and are independently selected from the group consisting of hydrogen, deuterium, cyano, halo, methyl, vinyl, allyl, and a substituted or unsubstituted isoprene having 1-100 carbon atoms;

x and y are the same or different and are an integer from 1 to 5, wherein when $L^1$ is a covalent bond, y=1.

4. The resin composition of claim 2, wherein the one or more dienophile monomers has a structure given by Formula (II)

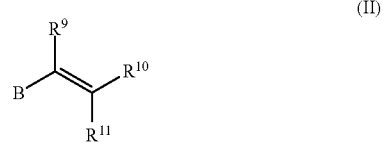
(II)

where:

B is hydrogen, substituted or unsubstituted alkyl, substituted or unsubstituted aromatic, substituted or unsubstituted heteroaromatic, substituted or unsubstituted alkyloxy, or hydroxy;

$R^9$-$R^{11}$ are the same or different and are independently selected from the group consisting of hydrogen, vinyl, allyl, substituted or unsubstituted isoprene having 1-100 carbon atoms, substituted or unsubstituted alkyl group having 1 to 100 carbon atoms, halogen, cyano, substituted or unsubstituted aryl group having 6 to 100 carbon atoms, substituted or unsubstituted heteroaryl group having 6 to 100 carbon atoms, and combinations thereof.

5. The resin composition of claim 2, wherein the one or more diene monomers has a structure given by Formula (IV)

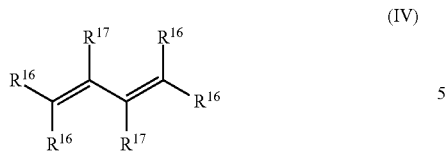
(IV)

where:
R$^{16}$ is the same or different and are independently selected from the group consisting of hydrogen and methyl; and
R$^{17}$ is the same or different and are independently selected from the group consisting of hydrogen, C$_{1-5}$ alkyl, C$_{1-5}$ alkoxy, C$_{1-5}$ thioalkyl, and C$_{5-12}$ alkenyl.

6. The resin composition of claim 2, wherein the one or more heterocycle containing monomers is selected from the group consisting of vinyl substituted C$_{3-12}$ heterocycles and vinyl-substituted C$_{3-5}$ heterocycles.

7. A liquid composition comprising the resin composition of claim 1 and one or more solvents.

* * * * *